Jan. 15, 1929.
J. F. O'CONNOR
1,698,729
SHOCK ABSORBER
Filed July 29, 1926
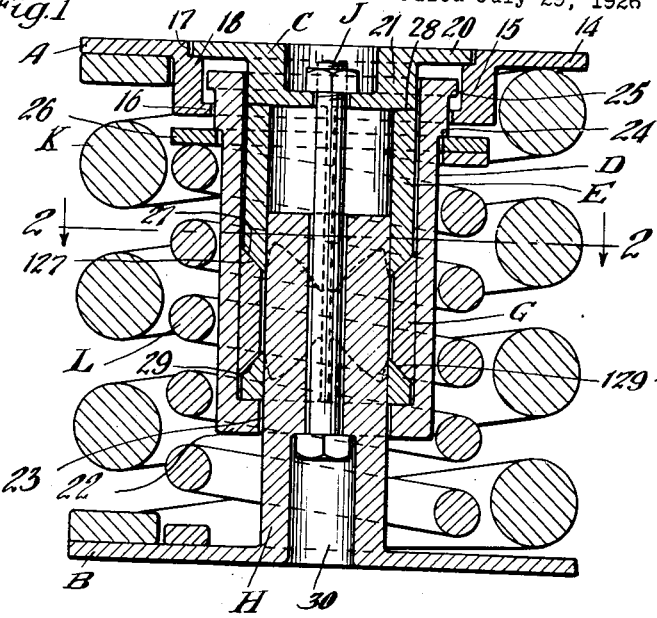
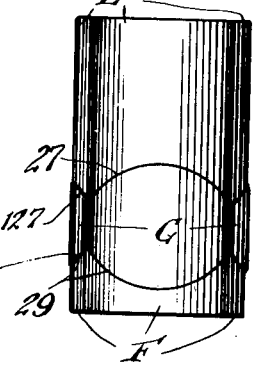
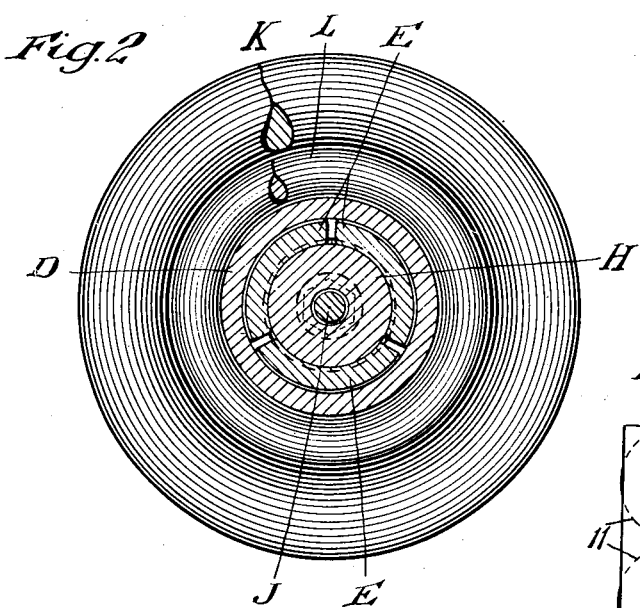
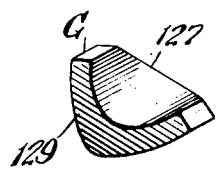
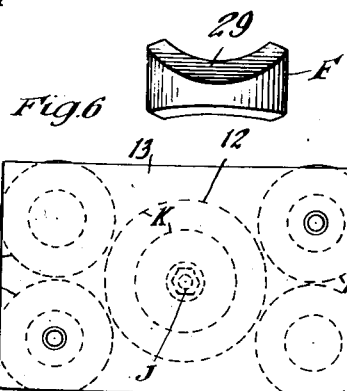
Witness
Wm. Geiger
Inventor
John F. O'Connor
By George I. Haight
His Atty.

Patented Jan. 15, 1929.

1,698,729

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

SHOCK ABSORBER.

Application filed July 29, 1926. Serial No. 125,604.

This invention relates to improvements in shock absorbers.

One object of the invention is to provide a shock absorber of high capacity, including a friction unit adapted for use in connection with spring-cushioning means for railway car trucks to support relatively heavy loads and provide a dampening means for the springs during compression of the latter to absorb heavy shocks.

Other objects and advantages of the invention will more fully and clearly appear from the description and claims hereinafter following.

In the drawing, Figure 1 is a vertical, sectional view through a shock absorbing unit embodying my invention. Figure 2 is a horizontal, sectional view corresponding substantially to the line 2—2 of Figure 1. Figure 3 is a side elevational view of a friction unit comprising two sets of friction shoes and a set of wedge blocks employed in connection with my improved mechanism. Figure 4 is a detailed, perspective view of one of the wedge blocks employed in connection with my improved mechanism. Figure 5 is a side elevational view of one of the friction shoes of the lower set. And Figure 6 is a diagrammatical view in plan, illustrating my improvements in combination with a group of springs forming the usual spring cluster employed in connection with car trucks.

In said drawings, referring more particularly to Figure 6, a spring cluster is illustrated comprising four outer springs 11—11 and a central shock absorbing unit 12 embodying the features of my invention. The springs 11 and the unit 12 are interposed between the usual top and bottom spring plates, the top spring plate 13 only being shown in the drawings. The top and bottom spring plates co-operate respectively with the usual truck bolster and spring plank, the spring plank in turn co-operating with the side frames of the truck in a well-known manner.

The improved shock absorbing unit involving my invention, comprises broadly: A top follower A; a bottom follower B; a pressure transmitting member C; a casing D; three friction shoes E—E—E; three friction shoes F—F—F; three wedge blocks G—G—G; a friction post H; a retainer bolt J; and a spring resistance comprising coils K and L.

The spring follower A comprises an annular ring-like member 14 and a downwardly projecting cylindrical flange 15. The flange 15 is relatively heavy and has an inturned lower edge presenting a horizontally disposed annular rib 16. The cylindrical flange 15 is cut away at the top as indicated at 17, thereby providing an annular shoulder 18. The shoulder 18 is spaced inwardly from the plane of the upper face of the flange 14, as clearly shown in Figure 1, for a purpose hereinafter described.

The spring follower B is in the form of a disc like member having a centrally disposed upwardly extending post H thereon, the post being provided with an outer cylindrical friction surface with which the two sets of friction shoes co-operate.

The pressure transmitting member C is in the form of a circular plate-like member having an annular disc section 20 and a downwardly projecting central boss 21. The annular disc-like section 20 is seated within the recess 17 of the follower A and is of such a thickness that the upper face of the same lies in the same plane as the upper face of the follower A when the lower face of the disc is in abutment with the shoulder 18 of the follower.

The casing D is in the form of a hollow cylinder having a bottom end wall 22 provided with a central opening 23 adapted to freely accommodate the friction post H. At the upper end, the cylinder D is provided with annular spaced shoulders 24 and 25, the shoulder 24 forming an abutment for a ring-like spring follower 26 and the shoulder 25 co-operating with the rib 16 of the follower A as hereinbefore pointed out.

The friction shoes E are three in number, and are arranged in annular series about the friction post. Each of the friction shoes E has an inner longitudinally disposed cylindrical friction surface co-operating with the friction surface of the post. At the lower end, each of the shoes E is provided with a downwardly and inwardly inclined wedge face 27 adapted to co-operate with the corresponding wedge block G. At the top, each friction shoe has a flat end face 28 adapted to bear on the lower face of the boss 21 of the pressure transmitting member C.

The friction shoes F which are three in number, are also arranged in annular series about the friction post H. Each shoe F has a flat wedge face 29 at the upper end thereof inclined upwardly and inwardly and co-operating with the corresponding end of one of the wedge blocks G. The bottom end of each shoe is provided with a flat face adapted to bear on the end wall 22 of the casing D.

The wedge blocks G which are three in number, are also arranged in annular series about the friction post and are interposed between the top and bottom sets of friction shoes E and F. Each of the wedge blocks G has a cylindrical outer face adapted to bear on the inner surface of the post D and a pair of wedge faces 127 and 129 at the opposite ends thereof adapted to co-operate respectively with the wedge faces 27 and 29 of the corresponding shoes of the top and bottom sets. As most clearly shown in Figure 1, the friction unit, comprising the shoes E and F and the wedge blocks G, is housed entirely within the casing D.

The spring resistance comprising two coils K and L is interposed between the top and bottom spring followers A and B. The coil K which is outermost, is relatively heavy and bears directly on the top and bottom spring followers. The lighter inner coil L surrounds the casing D and has the upper end thereof bearing on the spring follower ring 26 and the lower end bearing on the follower B.

The parts are held assembled by the retainer bolt J which has its opposite ends anchored to the post H and the pressure transmitting member C, the head of the bolt being accommodated within an opening 30 in the lower end of the post and the nut of the bolt being accommodated within the hollow boss 21 of the pressure transmitting member C.

The bolt J serves not only to hold the parts assembled, but also maintains the entire unit of uniform overall length.

As most clearly shown in Figure 1, the upper end of the casing D is normally slightly spaced from the lower face of the pressure transmitting member C and the shoulder 25 is spaced from the rib 16 of the follower A. The upper end of the friction post H is spaced a predetermined distance from the lower face of the boss 21 of the pressure transmitting member so as to permit the necessary amount of compression of the unit.

The operation of my improved device is as follows: Upon relative approach of the spring plank and the truck bolster, the coils 11 of the group of springs will be compressed. At the same time, the followers A and B will be moved relatively toward each other, effecting compression of the spring K. Inasmuch as the pressure transmitting member C is also in engagement with the spring plate of the truck bolster, the same will be carried inwardly toward the follower B with the follower A, thereby effecting a downward movement of the set of friction shoes E. Due to the inter-engaging wedge faces of these shoes and the wedge block G, a wedging action will be set up and the shoes pressed firmly against the friction surface of the post H. Downward movement of the wedge blocks G is resisted by the three friction shoes F, which bear on the end wall 22 of the casing D, downward movement of which is resisted by the spring L. Due to the inter-engaging wedge faces of the wedge blocks G and the friction shoes F, the latter will also be forced into tight frictional engagement with the surface of the post H. Due to the frictional resistance between the friction surface of the shoes and the post, high resistance will be offered during the relative approach of the followers A and B in addition to the resistance offered by the springs K and L.

Inasmuch as the spring follower A is movable to a limited extent with reference to the casing D before the rib 16 of the follower comes into engagement with the shoulder 25 of the casing, free expansion of the spring K is initially permitted after a shock has been absorbed. As the spring K expands, and the springs 11 of the group expand, the pressure will be removed from the upper ends of the friction shoes, thereby permitting the spring L to return the casing D and the friction system comprising the shoes E and F and the wedge blocks G to normal position. In case there is a tendency for the friction elements to stick during recoil, the spring followers A and B will be separated by the spring K to the extent of the space in between the shoulder 25 of the casing D and the rib 16 of the spring follower A. When this lost motion has been taken up, the spring L will become effective to aid in positively restoring the casing D and the contained friction system to normal position.

From the preceding description taken in connection with the drawings, it will be evident that my improved shock absorbing unit is particularly adapted for use in connection with a cluster or group of truck springs. However, the improved unit shown in Figure 1 is adapted for other uses and may be employed whenever shocks are to be absorbed.

By providing the combined friction and spring unit in combination with a group of springs, a cushioning device of capacity far exceeding spring devices now employed in connection with car trucks, is had. By my improvements, the danger of springs not functioning due to the heavy load imposed by the weight of the car is entirely overcome, while at the same time the cushioning elements are all within the limited space which they may occupy as prescribed by the regulations of standardization.

While I have herein shown and described what I now consider the preferred manner of carrying out my invention, the same is merely illustrative, and I contemplate all changes and modifications that come within the scope of the claims appended hereto.

I claim:

1. In a shock absorber for railway cars, the combination with a pair of relatively movable follower elements; of a friction member; friction shoes co-operating with said member, said member and shoes being relatively movable to each other upon relative movement of said followers; means for forcing said shoes against said member, including a plurality of wedge blocks; a coil spring resistance element opposing movement of said means, said coil surrounding said shoes and means for forcing the shoes against said member; an additional coil spring inclosing said first named coil spring and opposing relative movement of said followers.

2. In a shock absorber for railway car trucks, the combination with a plurality of spring resistance elements, including a centrally disposed spring element; of relatively movable follower elements; a friction element fixed with respect to one of said follower elements; a pressure transmitting element; a plurality of sets of friction shoes co-operating with said friction element, said shoes being movable by said pressure transmitting element, said friction elements and shoes being disposed within the central spring element; wedge means interposed between said sets of shoes; means for limiting outward displacement of said wedge elements; and an additional spring resistance interposed between said last named means and the follower element having the friction element associated therewith.

3. In a shock absorber for railway car trucks, the combination with a plurality of spring resistance elements, including a centrally disposed spring element; of a friction post; top and bottom sets of friction shoes co-operating with the post; wedge blocks interposed between said top and bottom sets of shoes and having wedging engagement with both sets; means for effecting relative movement of said shoes and post; spring means resisting movement of said wedge means and shoes, said post, shoes, wedge blocks and spring means being disposed within the centrally disposed spring.

4. In a shock absorbing mechanism, the combination with end followers relatively movable toward and away from each other; of a spring resistance interposed between said followers; a friction post movable with one of said followers; friction shoes co-operating with the post; a pressure transmitting member co-operating with the shoes; wedge means for forcing said shoes against the post; and means opposing movement of said shoes and wedge means, including a shell and spring means resisting movement of the shell.

5. In a shock absorbing mechanism, the combination with end followers relatively movable toward and away from each other; of a spring resistance interposed between said followers; a friction post movable with one of said followers; friction shoes co-operating with the post; a pressure transmitting member co-operating with the shoes; wedge means for forcing said shoes against the post; a shell enclosing said shoes and wedge means, said shell and certain of said shoes having inter-engaging abutment means thereon; spring means resisting movement of said shell; and means on one of said end followers for returning said shell to normal position.

6. In a shock absorber, the combination with follower elements movable relatively toward and away from each other; of a central friction post; a spring resistance including inner and outer members; friction shoes cooperating with the post, said shoes and post being moved relatively to each other upon relative approach of said followers, said outer member of the spring resistance opposing movement of said followers; a plurality of wedge blocks cooperating with the shoes; and means for limiting outward separation of said wedge blocks, said wedge blocks and shoes being disposed within said spring resistance, said inner member of the spring resistance opposing relative movement of said last named means and one of said followers.

In witness that I claim the foregoing I have hereunto subscribed my name this 23rd day of July, 1926.

JOHN F. O'CONNOR.